UNITED STATES PATENT OFFICE.

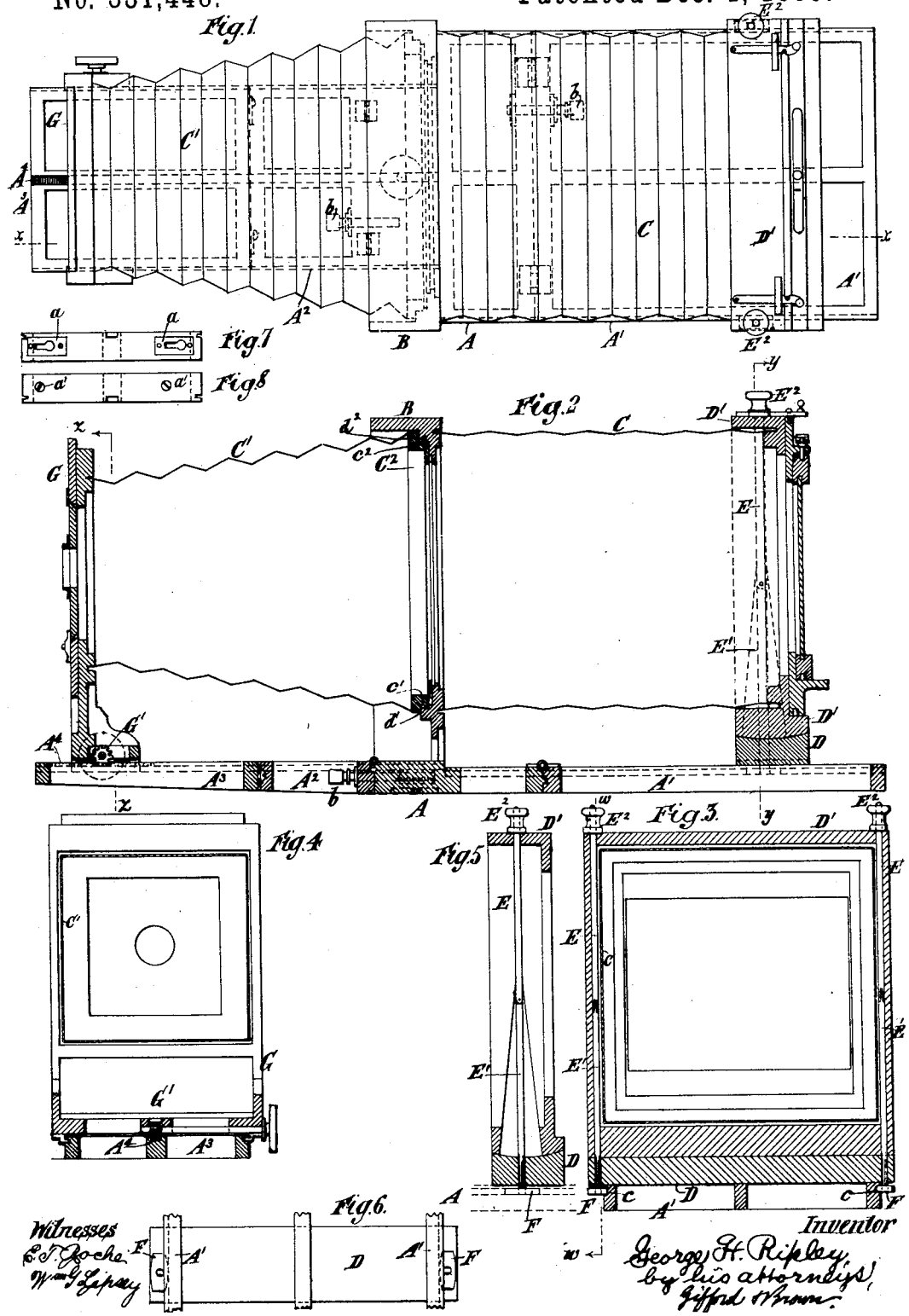

GEORGE H. RIPLEY, OF BROOKLYN, NEW YORK, ASSIGNOR TO THE SCOVILL MANUFACTURING COMPANY, OF WATERBURY, CONNECTICUT.

PHOTOGRAPHIC CAMERA.

SPECIFICATION forming part of Letters Patent No. 331,448, dated December 1, 1885.

Application filed March 6, 1885. Serial No. 157,890. (No model.)

*To all whom it may concern:*

Be it known that I, GEORGE H. RIPLEY, of Brooklyn, in Kings county, and State of New York, have invented a new and useful Improvement in Photographic Cameras, of which the following is a specification.

One object of my improvement is to enable a photographic camera to be used for taking long-focus pictures—such as landscapes—or short-focus pictures—such as portraits. To this end the improvement consists in the combination, in a photographic camera, of a base-frame, an upright frame erected thereon, a back piece adjustable along the base-frame toward and from the upright frame erected thereon, a body-section extending from the back piece to the said upright frame, a front piece adjustable along the base-frame toward and from said upright frame, and a body-section extending from this front piece to the said upright frame, and provided at the rear with means whereby it may be detachably secured to the said upright frame. Preferably, the forward part of the base-frame will be detachably secured to the main portion of said frame. By means of this improvement I am enabled to adjust both the back piece and the front piece at pleasure. When desirable to use the camera for long-focus photographing, both the front piece and back piece, as well as the body-sections attached thereto, will be used. In case, however, the camera is to be used for short-focus photographing, the front piece, with the forward section of the base-frame, may be removed, the body-section attached to said front piece being detached from the upright frame, which is erected upon the base-frame. Then another front piece, provided with appropriate lenses, may be attached to the said upright frame.

Another object of my improvement is to provide for adjusting the back piece of the camera at different angles and without materially adding to the thickness or dimensions of the back piece. To this end the improvement consists in the combination, with a base-frame, of a back piece having a bottom section that is free to slide lengthwise of the base-frame, and is provided with an arc-shaped surface and an upper section that is provided with an arc-shaped lower surface, and screws whereby the two sections of the back piece may be secured together in different relations. The slides of the back piece work in grooves in the base-frame, and are rounded lengthwise, so that both sections of the back piece together may be adjusted laterally with relation to the base-frame. When the screws of these slides are tightened, they may be made not only to secure the upper section of the back piece, but also to secure both sections of the back piece at different angles to the base-frame and in different positions to which they may be adjusted lengthwise of the base-frame.

In the accompanying drawings, Figure 1 is a plan view of a photographic camera in condition for use in taking long-focus pictures. Fig. 2 is a longitudinal section of the same, taken at the plane of the dotted line *x x*, Fig. 1. Fig. 3 is a transverse vertical section taken at the plane of the dotted line *y y*, Fig. 2, and looking in the direction indicated by the arrow, which is arranged at one end of the line. Fig. 4 is a transverse vertical section of the same, taken at the plane of the dotted line *z z*, Fig. 2, and looking in the direction indicated by the arrow, which is arranged at one end of this line. Fig. 5 is a vertical longitudinal section of certain parts, taken at the plane of the dotted line *w w*, Fig. 3, and looking in the direction indicated by the arrow, which is arranged at one end of this line. Fig. 6 is a top view of a portion of the base-frame. Fig. 7 is an end view of a portion of the main section of the base-frame. Fig. 8 is an end view of a detachable forward section of the base-frame, and shown as turned upside down.

Similar letters of reference designate corresponding parts in all the figures.

The base-frame of the camera is here shown as composed of four sections—a main section, A, which is intended to be secured to a tripod or other support, a section, A', hinged preferably by butt-hinges having detachable sections to the rear of the main section, and adapted to be swung upward when the camera is not in use, so as to render the camera more convenient for transportation, a section, A², hinged also preferably by butt-hinges having detachable sections to the forward end of the main section A, so that it may be swung upward to reduce the bulk of the camera when it is not in use, and a section, $A^3$, which is detachably secured to the forward end of the section $A^2$. The sections $A'$ $A^2$ may be secured in position in line with the section A by screw-bolts $b$ or other means. The section $A^2$ at the forward end is provided with cavities, outside of which are secured plates $a$, severally having in them slots which are made substantially in the shape of an ordinary key-hole—that is, with a parallel-sided portion and an enlarged rounded portion at one end. The section $A^3$ of the base-frame has projecting from the rear end screws $a'$. By pressing the section $A^3$ against or toward the section $A^2$ of the base-frame in such manner that the heads of the screws $a'$ will enter the enlarged ends of the slots in the plates $a$, and then moving the section $A^3$ widthwise, so that the bodies of the screws will pass into the parallel-sided portion of the slots in said plate, the section $A^3$ may be secured to the section $A^2$ of the base-frame. A reverse operation will result in the detachment of the section $A^3$ from the section $A^2$ of the base-frame.

B designates an upright frame mounted upon the section A of the base-frame. To the rear side of this upright frame a section, C, of the body of the camera is attached. It extends from the upright frame rearwardly to the back piece. The back piece consists of two sections, D D'. The section D consists of a bar, which rests upon the base-frame and is capable of being adjusted lengthwise thereof. The top surface is arc-shaped, its curve extending from front to rear and being concave. The section D' is made in the form of a frame. The bottom bar of the section D' is on the lower side are shaped to fit the arc-shaped top surface of the section D. The section D' may therefore be rocked forward or backward upon the section D, so that it may be made to assume different angles relatively to the base-frame. The two sections are secured together by means of screws E E'. Each of these screws consists of two sections, which are hinged together so that one may swing at an angle to the other forward or backward. The upper section, E, of each of the screws extends through a recess in a side piece of the section D', fitting snugly, but nevertheless being capable of movement up and down longitudinally. The lower section, E', of each of the screws fits in a recess whose sides flare forward and backward. The lower sections of the screws pass vertically through cavities provided in the section D of the back piece, near the ends, and extend down past the sides of the base-frame. At their extremities they have fixed to them slides F, which enter longitudinal grooves $c$ in the outer surfaces of the sides of the base-frame. The sections E of the screws are threaded near the upper ends and protrude through the top of the section D' of the back piece. Above the section D' of the back piece nuts $E^2$ are applied to the screws. By manipulating these nuts the screws may be caused to tighten the two sections of the back piece together, and also to clamp the slides F in their grooves of the base-frame, thus securing the sections of the back piece in proper relation to each other and the whole of the back piece upon the base-frame. Flaring cavities are provided in the section D' of the back piece for the sections E' of the screws, in order to prevent the screws from interfering with the swinging of the section D' of the back piece forward or backward at different angles. The slides F are preferably rounded or curved at the edges which impinge against the inner walls of the grooves $c$ of the base-frame, because when so made they may be rocked slightly with relation to the base-frame, in order to enable the back piece to be swung around with one side in advance of the other at different angles.

The appurtenances of the back piece may be of the ordinary or any approved style.

The back piece may be adjusted along the base-frame by the hand applied directly to it, or through the agency of any suitable appliances.

The upright frame B, as here shown, has detachably secured to it a body-section, C', of the camera. This section C' extends to the front piece, G, and is secured thereto.

The sections C C' of the body of the camera may be of the usual bellows-like construction, in order that they may be expanded and contracted at pleasure. The rear end of the section C' of the body has secured to it a frame, $C^2$. This frame $C^2$ may be made of wood or any other suitable material, and has grooves $c'$ $c^2$ extending along the exterior of the top and bottom rails. The groove $c^2$ of the top rail is deeper than the groove $c'$ in the bottom rail. The upright frame B is provided with lips $d'$ $d^2$, which are adapted to engage with the grooves $c'$ $c^2$ of the frame $C^2$. The lip $d^2$ is not as deep as the groove $c^2$; hence the frame $C^2$ may be engaged with the frame B by adjusting it into such position that its lip $c^2$ will be opposite the lip $d^2$, then forcing said frame $C^2$ upward and pressing its lower portion inward to bring the grooves $c'$ opposite the lip $d'$, whereupon the said frame $C^2$ will be slightly lowered to enable its groove $c'$ to slip over the lip $d'$. Owing to the extra depth of the groove $c^2$ the latter will not be disengaged from the lip $d^2$ by the lowering of the frame $C^2$, as just described. The frame $C^2$ may be disengaged from the frame B by forcing it upward sufficiently to remove its groove $c'$ from the lip $d'$, then moving forward the lower portion of said frame $C^2$, and ultimately lowering it to disengage the grooves $c^2$ from the lip $d^2$.

When the camera is to be used for taking long-focus pictures, the body-section C' is attached to the frame B, and the front piece, G, is used; but when the camera is to be used for short-focus pictures the body-section C will be detached, and preferably the section $A^3$ of the base-frame will also be detached. Then the ordinary front piece, provided with appropriate lenses, will be secured to the upright frame B. This front piece may be provided with grooves like those in the frame C², and then may be attached to the upright frame B, and detached from it in the same manner as the frame C².

The front piece, G, may be of the ordinary construction. It is provided with slides, which enter the grooves $c$ of the base-frame, and at the center of its base it is provided with a pinion, G', that engages with a toothed rack, A⁴, with which the base-frame is provided. The shaft upon which the pinion G' is mounted has at one end a handle, whereby it may be easily turned to effect the adjustment of the front piece toward and from the upright frame B.

The front piece may be provided with lenses of any approved style.

What I claim as my invention, and desire to secure by Letters Patent, is—

1. In a photographic camera, the combination of a base-frame, an upright frame, B, erected thereon, and provided with lips $d'\ d^2$, a back piece adjustable along the base-frame toward and from said upright frame B, a body-section, C, extending from the back piece to the upright frame B, a front piece adjustable along the base-frame toward and from said upright frame B, and a body-section, C', attached to the front piece and having secured to its rear end a frame, C², provided with grooves $c'\ c^2$, that are adapted to engage with the lips $d'\ d^2$ of the upright frame B, substantially as specified.

2. In a photographic camera, the combination of a base-frame provided with a detachable forward section, an upright frame erected thereon, a back piece adjustable along the base-frame toward and from the said upright frame, and a body-section extending from the back piece to the said upright frame, adjustable along the detachable forward section of the base-frame toward and from said upright frame, and provided at the rear with means whereby it may be adjustably secured to the said upright frame, substantially as specified.

3. In a photographic camera, the combination, with a base-frame having grooves in the sides, of a back piece composed of a base or lower section having an arc-shaped top surface, an upper section having an arc-shaped bottom surface, and screws extending through both sections, and having attached upon the lower ends slides which enter the grooves of the base-frame and are longitudinally rounded or curved to enable adjustments of the back piece with either side in advance of the other to be made.

GEO. H. RIPLEY.

Witnesses:
T. J. KEANE,
WM. G. LIPSEY.